US009151922B2

(12) United States Patent
Claessens et al.

(10) Patent No.: US 9,151,922 B2
(45) Date of Patent: Oct. 6, 2015

(54) CABLE SUPPORT FOR DISTRIBUTION BOXES, IN PARTICULAR FOR FTTH ENVIRONMENTS

(75) Inventors: Bart Mattie Claessens, Hasselt (BE); Roger Alaerts, Aarschot (BE)

(73) Assignee: Tyco Electronics Raychem BVBA (BE)

( * ) Notice: Subject to any disclaimer, the term of this patent is extended or adjusted under 35 U.S.C. 154(b) by 106 days.

(21) Appl. No.: 13/579,242

(22) PCT Filed: Feb. 3, 2011

(86) PCT No.: PCT/EP2011/051553
§ 371 (c)(1),
(2), (4) Date: Aug. 15, 2012

(87) PCT Pub. No.: WO2011/098389
PCT Pub. Date: Aug. 18, 2011

(65) Prior Publication Data
US 2012/0321268 A1    Dec. 20, 2012

(30) Foreign Application Priority Data

Feb. 15, 2010  (EP) .................................... 10001520

(51) Int. Cl.
*G02B 6/00*   (2006.01)
*G02B 6/44*   (2006.01)
(52) U.S. Cl.
CPC ............ *G02B 6/4477* (2013.01); *G02B 6/4446* (2013.01)
(58) Field of Classification Search
CPC ............................ G02B 6/4477; G02B 6/4446

USPC .......................................................... 385/135
See application file for complete search history.

(56) References Cited

U.S. PATENT DOCUMENTS

| 3,742,119 A * | 6/1973 | Newman ..................... 174/656 |
| 2006/0096197 A1 * | 5/2006 | Tollefson ................... 52/223.13 |

FOREIGN PATENT DOCUMENTS

| EP | 1 316 829 | 6/2003 |
| WO | WO 2008/042357 | 4/2008 |

* cited by examiner

*Primary Examiner* — Tina Wong
*Assistant Examiner* — Kajli Prince
(74) *Attorney, Agent, or Firm* — Merchant & Gould P.C.

(57) ABSTRACT

The invention relates to a cable support (6,7,8) for distribution boxes (1), in particular for FTTH environments, the cable support (6,7,8) comprising at least one cable passage (6d, 7d, 8d), the cable passage (6d,7d,8d) adapted to receive at least one cable (19). Further, the invention relates to a distribution box (1) for cable distribution arrangements, in particular for FTTH environments, comprising a housing (2) and a cable support (6,7,8), the cable support (6,7,8) comprising a plurality of cable passages (6d,7d,8d), each cable passage (6d,7d, 8d) adapted to receive at least one cable (19). To facilitate the maintenance of distribution systems and the installation of additional cables, the cable support (6,7,8) is a stackable modular assembly of at least two segment blocks (6a,6b,6c, 7a,7b,7c,8a,8b,8c), each of which form, at a respective end (31,32) thereof pointing in or against a stacking direction (S), a part of at least one cable passage (6d,7d,8d).

19 Claims, 9 Drawing Sheets

CABLE SUPPORT FOR DISTRIBUTION BOXES, IN PARTICULAR FOR FTTH ENVIRONMENTS

This application is a National Stage Application of PCT/EP2011/051553, filed 3 Feb. 2011, which claims benefit of Serial No. 10001520.5, filed 5 Feb. 2010 in Europe and which applications are incorporated herein by reference. To the extent appropriate, a claim of priority os made to each of the above disclosed applications.

BACKGROUND

The Invention relates to a cable support for distribution boxes, in particular for FTTH environments, the cable support comprising at least one cable passage, the cable passage adapted to receive at least one cable.

Further, the invention relates to a distribution box for cable distribution arrangements, in particular for FTTH environments, comprising a housing and a cable support, the cable support comprising a plurality of cable passages, each cable passage adapted to receive at least one cable.

Distribution boxes for fibre to the home (FTTH) environments are known. FTTH is a generic term for any broadband network architecture that uses optical fibres for last mile telecommunications to reach the boundary of the living space, such as a multi-dwelling unit. In a typical optical signal distribution system, which may be provided within a multi-dwelling unit, outside service provider cables from a provider are routed to the multi-dwelling unit. Further, individual optical fibres or fibre bundles coupled to the outside service provider cables are routed to individual end users. The cables from the provider pass through building distribution boxes, typically provided in the basement and/or distribution cabinets located in the building. Via the building distribution box the outside provider cable is routed to riser cables which feed individual dwelling units.

Typically, the space available for the optical network or distribution system within the multi-dwelling units is limited. The limited space impedes the maintenance of the distribution box and the connection of additional cables.

Accordingly, it is desired to provide an improved distribution box which facilitates the maintenance of distribution systems and the installation of additional cables.

With regard to a cable support, the problem is solved by providing a cable support which is a stackable modular assembly of at least two segment blocks, each of which segments blocks form, at a respective end thereof pointing in or against a stacking direction, a part of at least one cable passage.

For the distribution box mentioned above, the problem is solved in accordance with the invention by providing at least two segment blocks, the segment blocks being plugged into each other, each of the at least two segment blocks forming, at a respective end thereof pointing in or against a stacking direction, a part of at least one cable passage.

SUMMARY

The solution according to the invention facilitates mounting and dismounting of cables, as the cable passage of the cable support can be opened or enlarged by moving apart or by separating at least two segment blocks which together form a selected cable passage. Thus, the access to selected cable passages is improved. Further, after inserting a cable into the at least one cable passage, the cable passage can be tightened up to a position at which the cable passage or the segment blocks encompass the cable sealingly.

The solution according to the invention may be combined in any way with the following further advantageous embodiments respectively and further improved.

According to a first advantageous embodiment, the cable support can be provided with a plurality of cable passages. The cable passages can be arranged in parallel on one segment block and transversely to the stacking direction or in parallel on several segment blocks and parallel to the stacking direction. Hence, when dismounting the cable support to add or to replace a cable, the cable passages may be opened one after another or simultaneously.

The segment blocks can be moved from a mounted state, at which inner surfaces of the at least one cable passage sealingly encompass a cable received by the cable passage, to a pre-mounted state, the segment blocks at the pre-mounted state being moved apart from each other to increase the diameter of the at least one cable passage. For a maximum increase in diameter of the cable passage in each of the at least two segment blocks, a half cross section of the at least one cable passage may be formed.

To seal the distribution box against environmental effects, the at least one cable passage may be closed by push-out elements, which may be removed when a cable is inserted. At least one of the at least two segment blocks can comprise an integrally cast push-out element which closes the at least one cable passage.

To improve the sealing of the cable passage, each of the at least two segment blocks may comprise an integrally cast push-out element, wherein push-out elements of adjacent segment blocks extend in parallel and in opposing directions into the cable passage. Preferably, push-out elements of adjacent segment blocks overlap each other transversely to the cable passage.

In a further advantageous embodiment of the invention, the segment blocks may each comprise at least one complementary positive locking member. At least one end of a segment block may comprise at least one positive locking member, the positive locking member being formed complementary to a positive locking member at an end of another segment block. A first segment block can have a first positive locking member. A second segment block, which at a mounted state is arranged adjacent to the first segment block, can have a second positive locking member, the second positive locking member being configured complementary to the first positive locking member. At a mounted state of the cable support, adjacent segment blocks may be connected to each other by a positive lock to reinforce the cable support. Further, providing the segment blocks with complementary positive locking members allows for preassembling the cable support before mounting the cable support on a distribution box.

According to a further advantageous embodiment of the cable support, the segment blocks may comprise at least one intermediate segment block which on each end opposing in stacking direction forms part of at least one cable passage. Hence, further interstices are provided within the cable support and the cable passages can be opened more independently. Preferably, the interfaces between segment blocks pointing in a common direction, for example in or against the stacking direction, are configured identically. Alternatively, both ends of the segment blocks pointing in or against the stacking direction may be shaped identically. Thus, a modular concept is realised which facilitates the configuration of different cable supports for varying distribution boxes or different cable types chromatically.

To reinforce or to facilitate setting up a preassembly of a cable support comprising intermediate segment blocks, the intermediate segment blocks may be provided with positive locking members at each of its ends opposing in stacking direction.

The positive locking members may comprise at least one resiliently deflectable latch member and at least one complementary locking section, the resiliently deflectable latch member of a segment block engaging with the locking section of an adjacent segment block. The at least one positive locking member at one end of a segment block may comprise at least one resiliently deflectable latch member and the at least one positive locking member at an end of another segment block may comprise a locking section which is shaped complementary to the latch member. Thus, the segment blocks may be clicked on each other.

In order to further facilitate mounting and dismounting of the cable support, each segment block can be provided at least at one end with at least one access opening for a tool for mounting or dismounting the cable support, wherein at a mounted state of the cable support access openings of adjacent segment blocks in a mounted state of the cable support are aligned with each other. The aligned openings may form a through-hole of the cable support. Hence, at least one rod-shaped or pin-shaped tool may be inserted into the cable support to serve as guidance for the segment blocks while the segment blocks are connected to each other or dismounted. All segment blocks of a cable support are preferably unlocked simultaneously when at least one or two dismounting tools have been applied to the cable support.

The latch members and the locking sections are preferably aligned to each other in stacking direction. Further, the latch members may be aligned with the access axis. The access openings together with the latch members and/or the locking sections in an unlocked state of the latch members or of the cable support may form a tool passage, in particular for a rod-like or pin-like tool, which extends along the access axis. To guide the tool within the cable support, the access openings and/or the latch members and the positive locking members may form a tool guidance. Preferably, a dismounting tool inserted into the tool passage retains all positive locking members, which are aligned along the tool passage, at an unlocked state.

According to a further advantageous embodiment of the invention, the at least one latch member may be aligned with the access axis or located on the access axis. The latch member may be arranged to be deflected by the dismounting tool when the dismounting tool is inserted into the cable support. Preferably, the latch member is moved by the dismounting tool into an unlock direction or off the locking section. Thus, the dismounting tool may serve for unlocking the positive locking members of the cable support.

To accelerate the mounting or dismounting process of the cable support, several or all segment blocks of a cable support may be adapted to be unlocked simultaneously by introducing one or at least two dismounting tools. Preferably, the positive locking members, which are aligned with a common access axis, may be adapted to be unlocked simultaneously when a dismounting tool is inserted.

To improve the guidance of the dismounting tool when the dismounting tool is inserted into the cable support, the access openings of the segment blocks may be adapted to guide the dismounting tool. For example, the dismounting tool may be shaped as a cylindrical rod having a circular cross section. The access openings can have a corresponding circular cross section provided with a slightly increased diameter to receive the dismounting tool.

According to a further advantageous embodiment of a distribution box according to the invention, the housing of the distribution box may comprise an exterior wall, a part of the exterior wall being formed by at least two segment blocks or by a cable support. Preferably, the cable support is configured as an insert, the exterior wall being provided with a receptacle to receive the insert. For example, the receptacle can be formed by a recess in the exterior wall. The receptacle may be provided with fastening webs which are adapted to engage with complementary shaped fastening webs of the cable support. Alternatively, the receptacle may have at least one rail-shaped protrusion which is adapted to engage with a groove at the cable support.

The cable support is preferably made of plastics. Preferentially, the segment blocks are injection moulded.

For mounting at least one cable on a cable support of a distribution box, at least one cable passage may be opened, the cable can be inserted into the cable passage and the cable passage can be closed. The maintenance of the distribution system and the installation of additional cables is facilitated by moving apart at least two segment blocks which together form at least one cable passage when opening the at least one cable passage. By moving the segment blocks apart, the space for inserting an additional cable into the distribution box or for dismounting a cable is expanded.

To further facilitate and accelerate the dismounting process, the method may include the step of unlocking at least one positive lock between segment blocks by inserting a dismounting tool into aligned access openings of the segment blocks, or the step of releasing positive lock connections between the segment blocks by inserting the dismounting tool in a stacking direction into aligned access openings. Preferably, the positive locking between segment blocks is released automatically or self-actingly when the dismounting tool is inserted into the aligned access openings.

To improve the guidance of the segment blocks when the segment blocks are separated, the dismounting tool together with the aligned access openings may serve to guide the segment blocks or guide the segment blocks while they are separated.

BRIEF DESCRIPTION OF THE DRAWINGS

The invention will be described hereinafter in greater detail and in an exemplary manner using advantageous embodiments and with reference to the drawings. The various features of the described embodiments and the advantages to be achieved with it can be combined or omitted independently of one another, as can already be seen from the above configurations. In the drawings.

DETAILED DESCRIPTION

Figure 1:
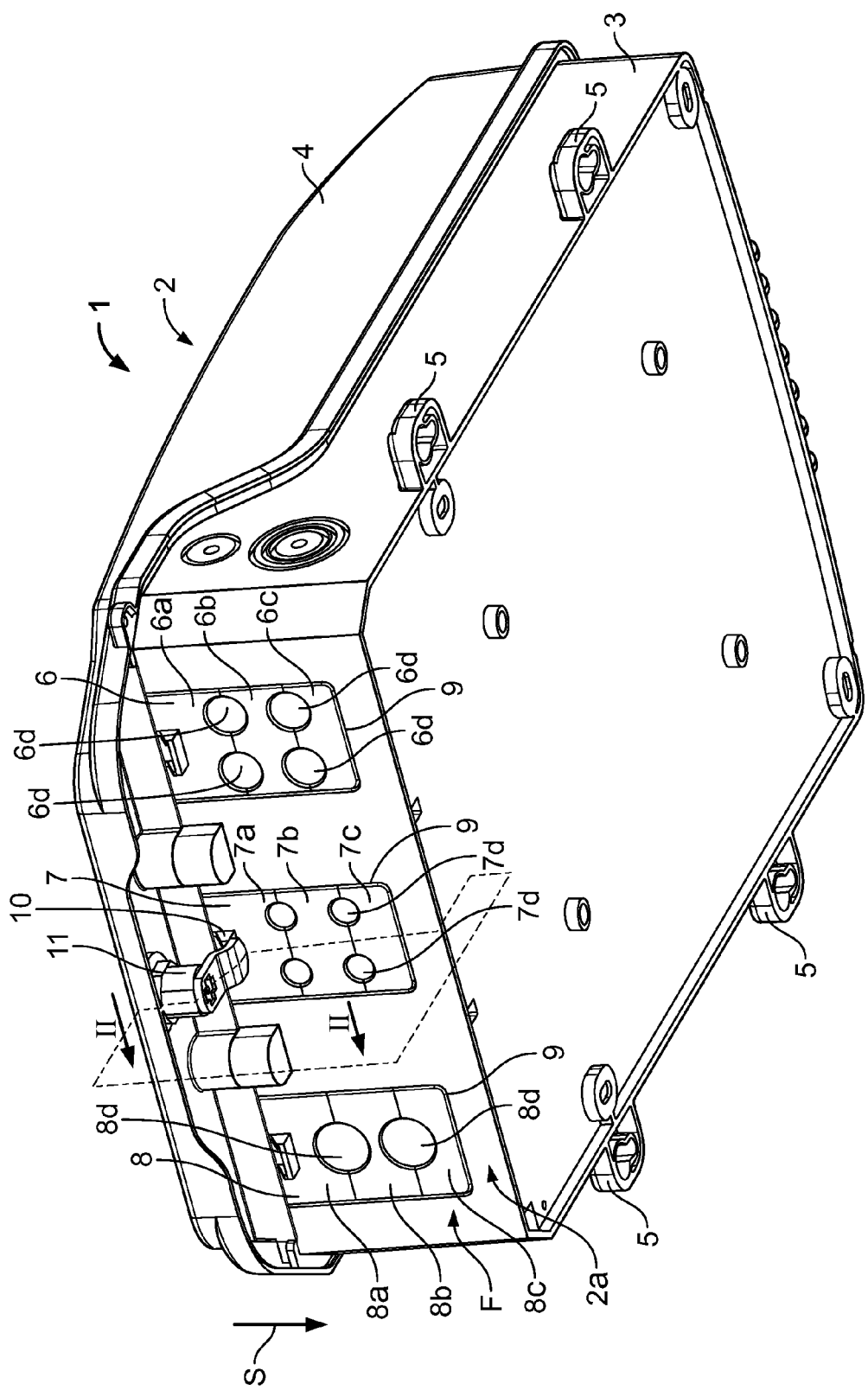
FIG. 1 is a schematic perspective view of a distribution box configured according to the invention.

First of all, an exemplary embodiment of a distribution box configured according to the present invention will be described with reference to FIG. 1. The distribution box 1 is preferably configured for fibre to the home (FTTH) environments. The distribution box 1 comprises a housing 2 which is provided with a base body 3 and a closure body 4. The base body 3 has fastening means 5 which serve for mounting the distribution box, for example on a basement wall of a multi-dwelling unit.

At a bottom side F, the distribution box is equipped with three cable supports 6, 7, 8, wherein each cable support 6, 7, 8 comprises three segments blocks 6a, 6b, 6c, 7a, 7b, 7c, 8a, 8b, 8c. The cable support 6, 7, 8 and their segments blocks form a part of an exterior wall 2a of the housing 2.

The base body 3 of the housing 2 is provided with receptacles 9 for receiving the cable supports 6, 7, 8. The cable supports 6, 7, 8 have identical outer dimensions. Thus, the cable supports 6, 7, 8 may be inserted into identical receptacles 9.

Each cable support 6, 7, 8 comprises a plurality of cable passages 6d, 7d, 8d, each cable passage adapted to receive at least one cable. At the distribution box of FIG. 1 an unmounted state is shown at which no cables are inserted into the cable passages 6d, 7d, 8d. To seal the distribution box 1 against environment, the cable passages 6d, 7d, 8d are closed by push-out elements, which may be removed when a cable is inserted.

The cable supports 6, 7, 8 each comprise a top segment block 6a, 7a, 8a, and intermediate segment block 6b, 7b, 8b and a bottom segment block 6c, 7c, 8c. The bottom segment blocks 6c, 7c, 8c are shaped complementary to the bottom of the receptacles 9 to fit sealingly with the receptacles 9. The top segment blocks 6a, 7a, 8a are provided with a locking section 10 which is formed by a protrusion extending in a longitudinal direction of the distribution box. The locking section 10 of the middle cable support 7 is configured to engage with a latch of a lock 11 which is disposed at the closure body 4 and serves for locking the distribution box 1 in the closed position shown in FIG. 1.

Each of the segment blocks form half cross sections of the cable passages 6d, 7d, 8d. The intermediate segment blocks 6b, 7b, 8b on each end opposing in a stacking direction S form parts of at least one cable passage.

Figure 2:
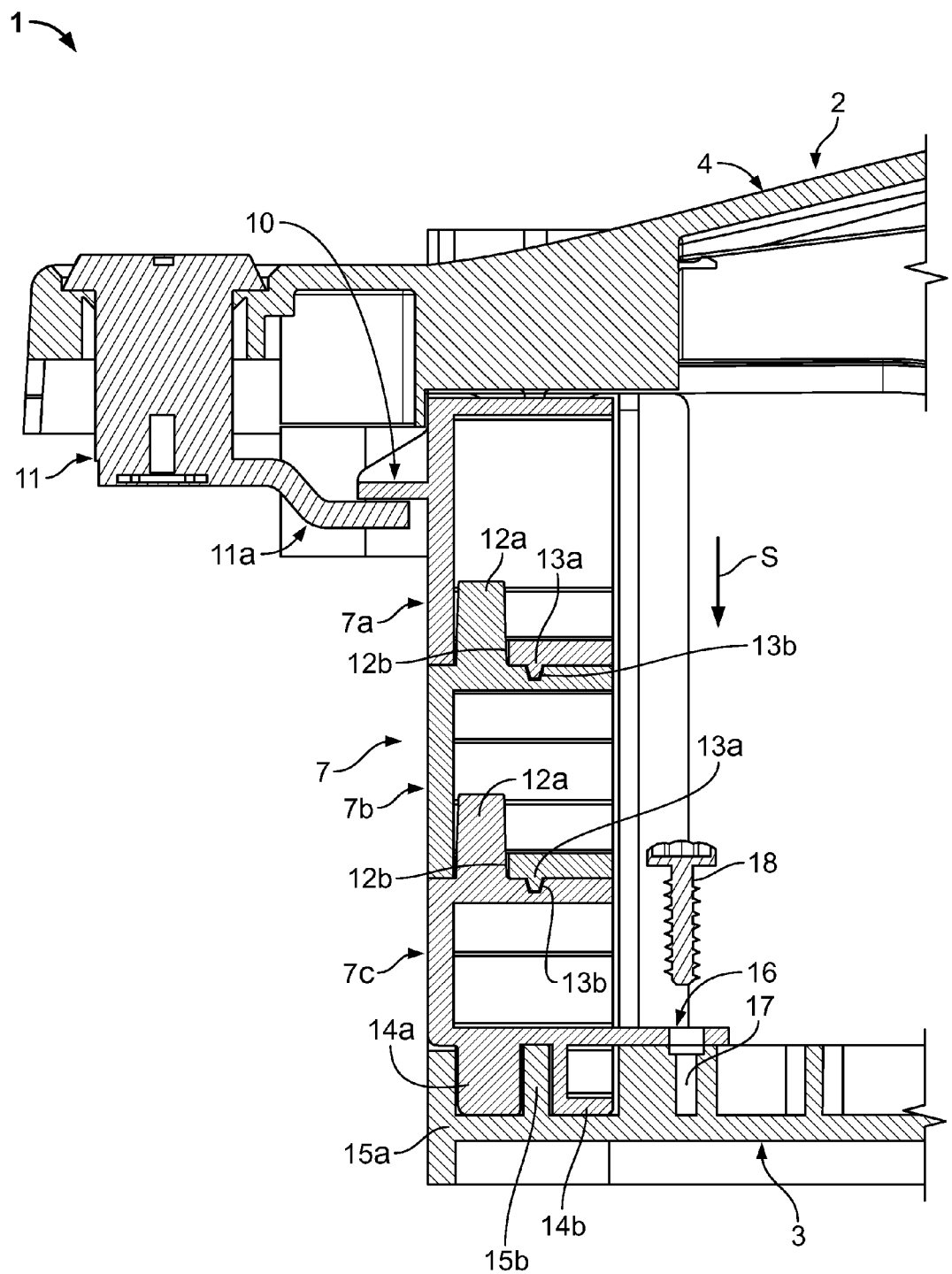
FIG. 2 is a cross sectional partial view of the distribution box of FIG. 1 according to sectional plain II-II.

FIG. 2 is a partial cross sectional view of a distribution box and shows a cable support 7 at the sectional layer II-II of FIG. 1.

The closure body 4 of the distribution box 1 is shown at a closed and locked state. At the state, a latch 11a of the lock 11 engages behind the locking section 10 of the top segment block 7a of the cable support 7.

The segment blocks 7a, 7b, 7c are stacked and plugged on each other in a stacking direction S. To build up a resistant exterior wall of the housing 2, interfaces between the segments blocks 7a, 7b, 7c are provided with interlocking members 12a, 12b, 13a, 13a, 13b which are configured complementary to each other and engage with each other when the cable support 7 is assembled. Interlocking members 12a, which are shaped as protrusions, are inserted into interlocking members 12b, which are configured as openings. Web-like interlocking members 13a engage with groove-like interlocking members 13b. The interlocking members 13a and 13b pass through the whole cable support and serve to align the segment blocks when the cable support is mounted. Further, the bottom segment blocks 7c have rib-like interlocking members 14a, 14b which are adapted to engage with interlocking members 15a, 15b of the base body 3. All positive locking members and interlocking members are adapted to mate with each other in stacking direction S.

To affix the bottom segment block 7c to the base body 3, the bottom segment block 7c is provided with a mounting eye 16, which in a mounted stated of the cable support is aligned with a bore 17 to receive a fastening screw 18.

Figure 3:
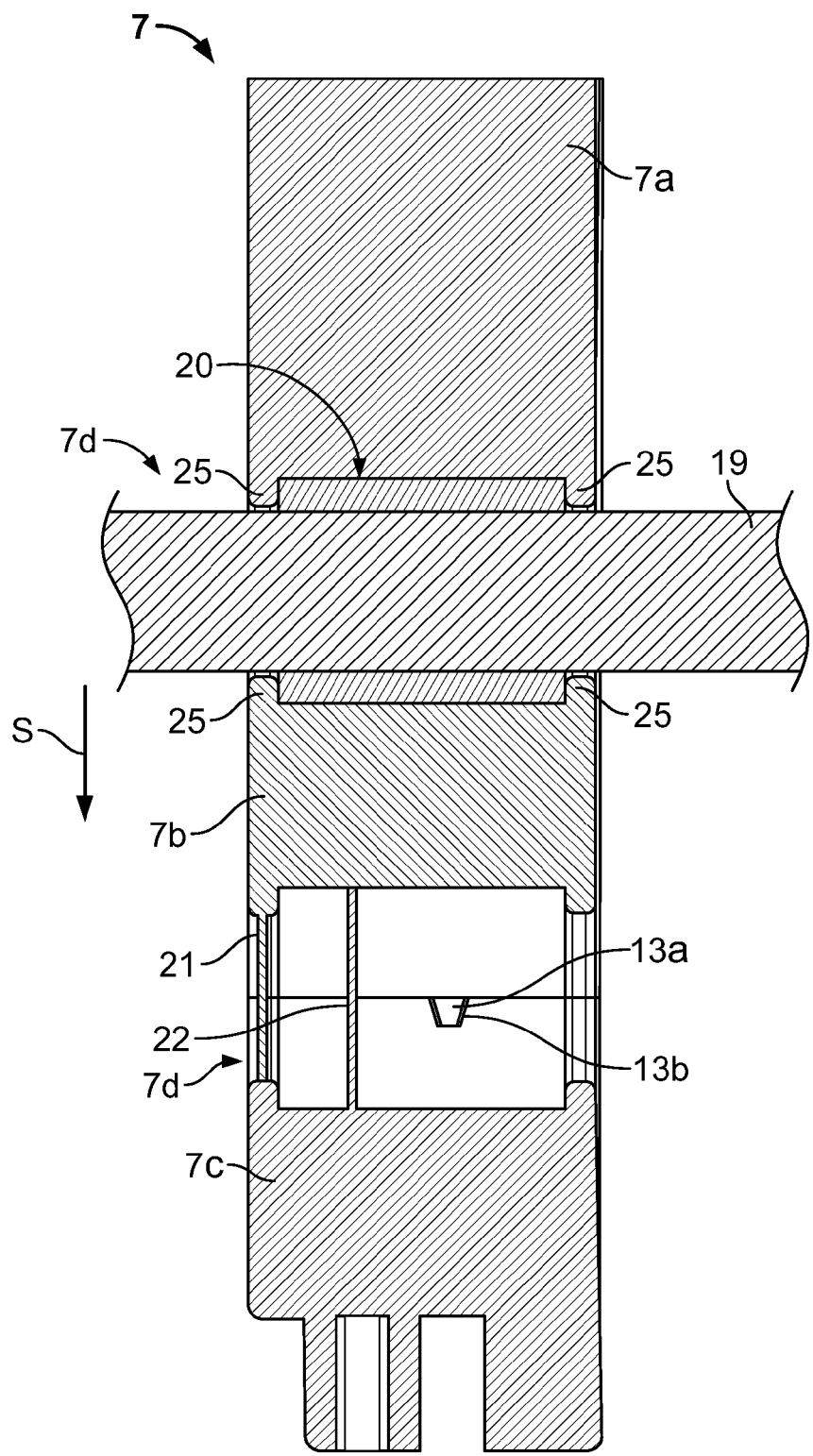
FIG. 3 is a cross sectional view of a cable support according to the invention.

FIG. 3 is a schematic cross sectional view of the cable support 7 shown in FIGS. 1 and 2. Into the cable passage 7d which is formed by the top segment block 7a and the intermediate segment block 7b a cable 19 is inserted. The cable 19 may be an electrical or preferably a fibre optic cable. To seal the housing against the environment, the cable passage 7d is equipped with a sealing member 20 which surrounds the cable 19. The sealing member 20 is located within a circumferential recess at the inner phase of the cable passage 7d facing the cable 19. The sealing member 20 is made of elastic material, for example rubber or silicon and can be configured foam-like.

At the lower cable passage, 7d no cable is inserted. To seal the lower cable passage 7d against ingress of dust or water, the cable support 7 comprises push-out elements 21 and 22. Both push-out elements 21 and 22 have a circular shape which abuts the inner surface of the cable passage 7d. The push-out elements of the adjacent segment blocks 7b, 7c extend in parallel and in opposing directions into the cable passages 7d. Preferably, the push-out elements of adjacent segment blocks overlap each other transversely to the longitudinal direction of the cable passage or in stacking direction S. Additionally, the push-out elements 21 and 22 overlap in a mounted state of the cable support. Thus, as long as the push-out elements 21 and 22 remain within the cable passage 7d, the cable passage 7d is completely closed. A first push-out element 21 is part of the intermediate segment block 7b, the second push-out element 22 is part of the bottom segment block 7c. After moving the intermediate segment block 7b and the bottom segment block 7c apart from each other, the push-out elements 21, 22 may be pushed or pulled down and removed from the cable passage 7d.

Figure 4:
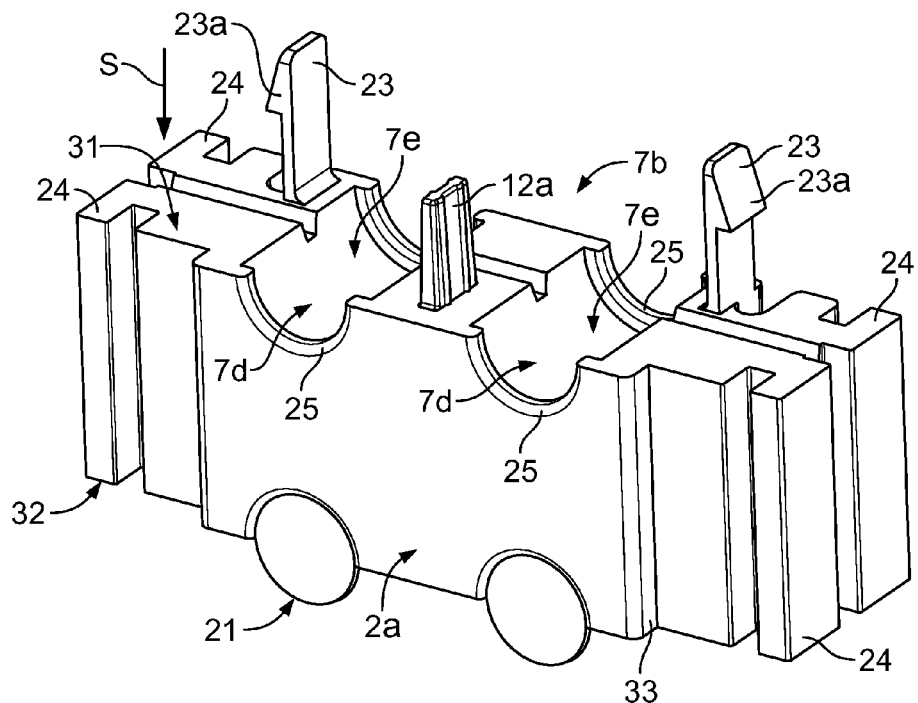
FIG. 4 is a schematic perspective view of an intermediate segment block according to the invention.

FIG. 4 is a schematic view of an intermediate segment block 7b. The segment block 7b is provided with positive locking members 23, which comprise latch members 23a. The positive locking members 23 are located at an end 31 of the intermediate segment block 7b pointing against stacking direction S. Further positive locking members 26 (shown in FIG. 6) are arranged at an end 32 pointing in stacking direction S. The latch members 23a are shaped as snap-fit latches. At mounted state of the cable support, the positive locking members 23 extend into the top segment block 7a where the positive locking members 23 engage with complementary positive locking members at the top segment block. At ends opposing transversally to the stacking direction S, the segment block 7b is provided with rail-like fastening webs 24 which extend in stacking direction S. The fastening webs 24 are at a mounted state of the distribution box inserted into complementary fastening grooves at the receptacles 9 of the base body 3.

Each of the segment blocks 7a, 7b, 7c form half cross sections 7e of cable passages 7d. At opposing ends of the cable passages 7d ring-like protrusions 25 are disposed which serve to affix the seal member 20 shown in FIG. 3 by a form closure.

At the bottom end of the intermediate segment block 7b push-out elements 21 are disposed which at mounted state of the cable support 7 extend into the part of the cable passage 7d. At mounted state of the cable support 7 the cable passage 7d is formed, for example, by the bottom part 7c shown in FIG. 5 and the intermediate segment block 7b. Correspondingly, push-out elements 22 at the bottom segment block 7c extend in a mounted state also into the part of the cable passage 7d which is formed by the intermediate segment block 7b.

The cable supports 6, 7, 8 and their segments blocks form a part of an exterior wall 2a of the housing 2. Protrusions 33 at the segments blocks, which protrude transversely to the stacking direction S, are adapted to flush with the exterior wall 2a when inserted into the receptacles 9 (see FIG. 1).

Figure 5:
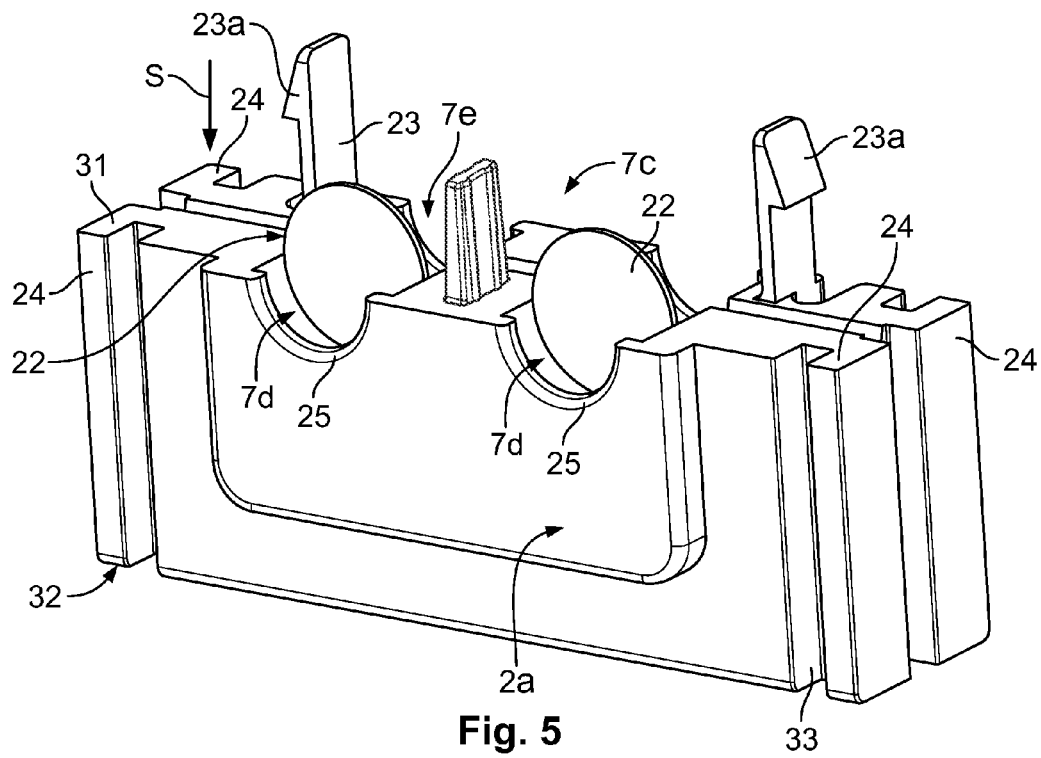
FIG. 5 is a schematic perspective view of a segment block according to the invention which forms an end of a cable support.

As shown in FIG. 5, also the bottom segment block 7c is provided with positive locking members 23, which comprise latch members 23a. The positive locking members 23 are located at an end 31 of the bottom segment block 7b pointing against stacking direction S and at a mounted state aligned with the positive locking members 23 at the intermediate segment block 7b.

The cable support 7 is configured as a stackable modular assembly of at least two segment blocks, each of which form, at opposing ends 31, 32 thereof pointing in or against a stacking direction S, a part of at least one cable passage 7d. In each of the two segment blocks 7a,7b,7c a half cross-section 7e of the at least one cable passage 7d is formed.

To increase the number of cable passages or the height of the cable support, a plurality of intermediate segment blocks may be stacked on each other. Thus, the dimensions of the cable support may be adapted to different distribution boxes by using different numbers of intermediate segment blocks in combination with a bottom segment block and a top segment block.

Figure 6:
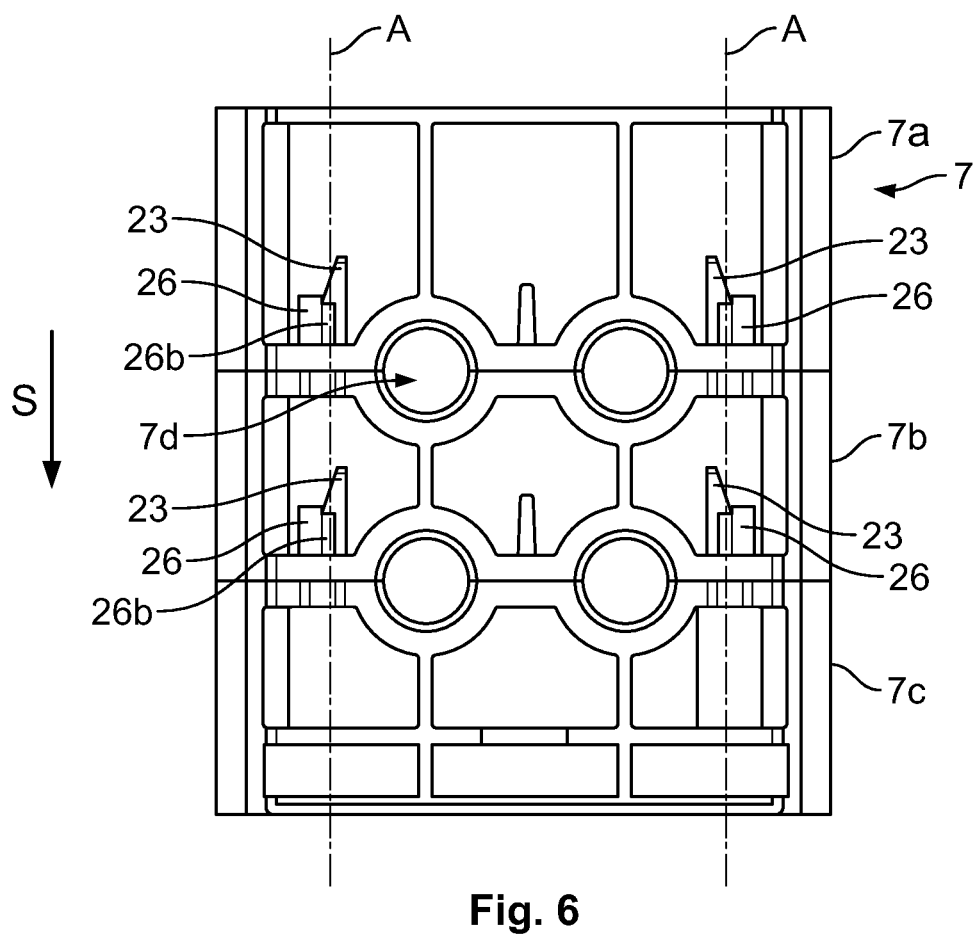
FIG. 6 is a schematic side view of a cable support according to the invention.

FIG. 6 is a schematic side view of a cable support according to the present invention.

At the inner side of the cable support 7, the positive locking members 23 and 26 are arranged. A pair of a positive locking member 23 and a positive locking member 26 forms a snap-fit connection. The positive locking members 23 which extend against stacking direction S form snap-fit latches which engage behind complementary positive locking members 26. The top segment block 7a, the intermediate segment block 7b and the bottom segment block 7c are provided with positive locking members 23, which comprise latch members 23a. Further, the top segment block 7a and the intermediate segment block 7b are provided with positive locking members 26, which comprise locking sections 26b (see also FIG. 10). The locking sections 26b are located at ends 32 of the top segment block 7a and the intermediate segment block 7b. The latch members 23a engage with locking sections 26b at the positive locking members 26.

Figure 7:
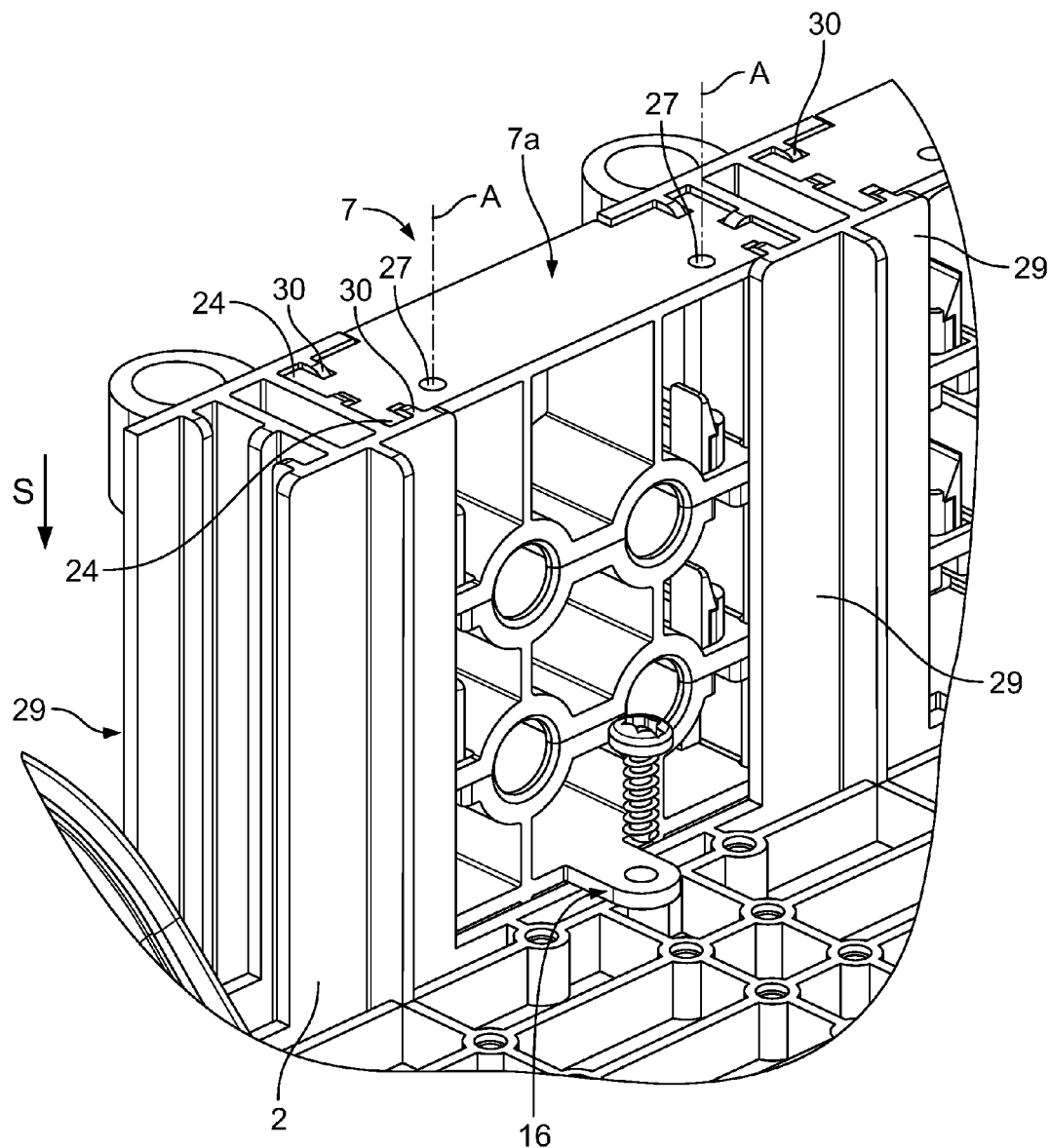
FIG. 7 is a schematic perspective partial view of a distribution box according to the invention.
Figure 8:
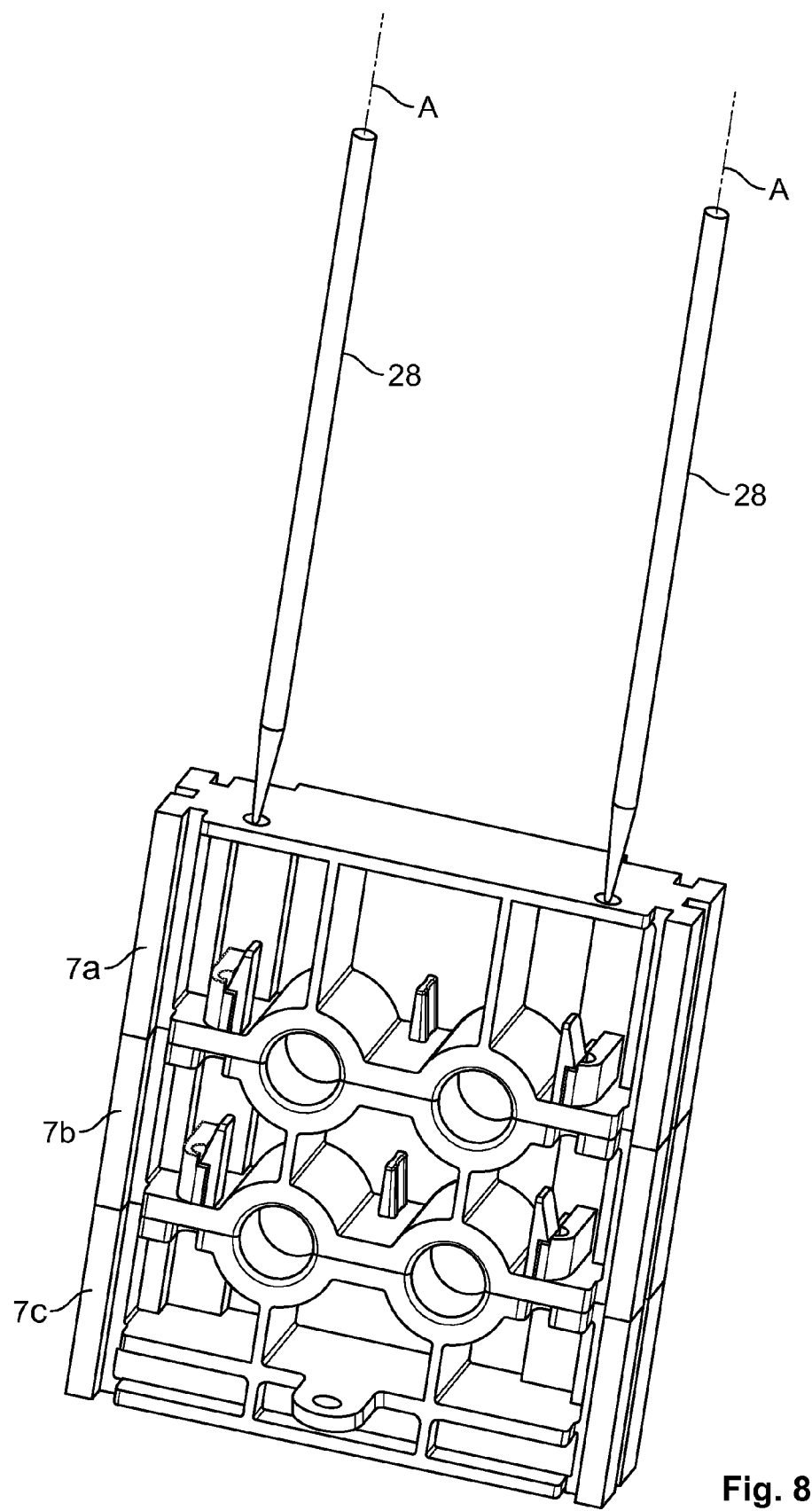
FIG. 8 is a perspective view of a cable support and two dismounting tools according to the present invention.

As shown in FIG. 7, the cable support 7 and each segment block is provided with access openings 27 for inserting a rod-like dismounting tool 28 which is shown in FIG. 8. The access openings 27 of adjacent segment blocks of the cable support 7 are aligned with each other such that the dismounting tool 28 may be inserted along an axis access. As illustrated in FIG. 6, also the latch-like positive locking members 23 are located on axis access A. By inserting a dismounting tool 28 into the cable support 7, the positive lock between the positive locking member 26 and the complementary positive locking member 23 is released.

Figure 9:
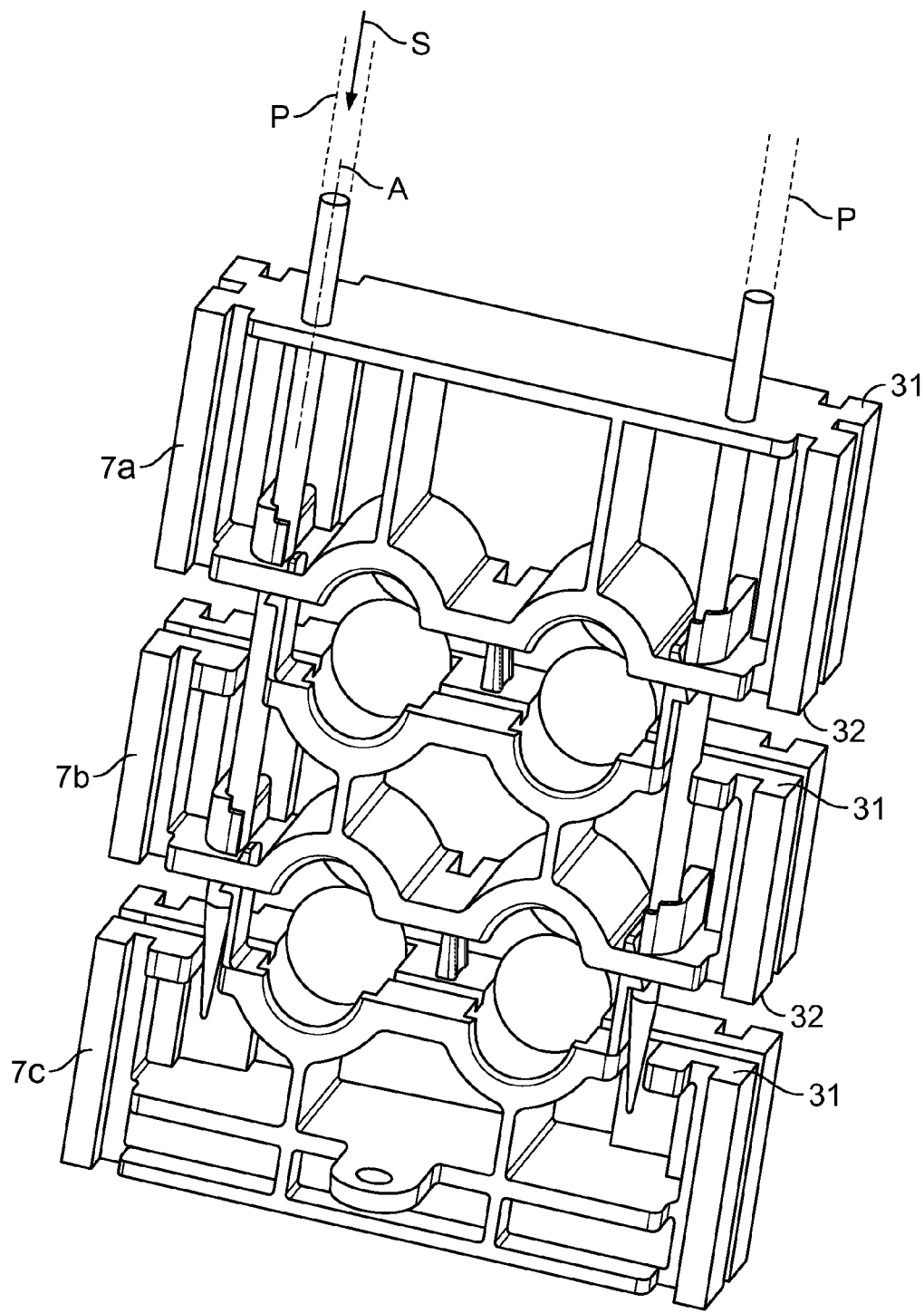
FIG. 9 is a schematic perspective view of a cable support with inserted dismounting tools.

All segment blocks of a cable support may be retained at unlocked state simultaneously when dismounting tools 28 have been introduced. Thus, after inserting a dismounting tool 28 into each of the access openings 27, the segment blocks may be moved apart from each other, as shown in FIG. 9. While separating the segment blocks 7a, 7b, 7c from each other, the dismounting tools 28 serve as guidance which guide the segment 7a, 7b, 7c in or against stacking direction S. Further, the segment blocks 7a, 7b, 7c are guided by the housing. As shown in FIG. 7, the fastening webs 24 are received guidingly by receptacles 29 of the housing 2. The receptacles 29 have a frame-like shape and are at their inner side facing the cable support provided with fastening webs 30. The fastening webs 30 are configured to engage with the fastening webs 24 and to guide the fastening webs 24 slidingly in or against stacking direction S.

The latch members 23a and the locking sections 26b are preferably aligned to each other in stacking direction S. Further, the latch members 23a may be aligned with the access axis. Thus, the access openings 27 together with the latch members 23a and the locking sections 26 in an unlocked state may form a tool passage P, in particular for a rod-like or pin-like tool, which extends along the access axis A. To guide the tool 28a within the cable support, the access openings 27 and/or the latch members 23a and the positive locking members 26 may form a tool guidance. The tool guidance may correspond to the tool passage P.

Figure 10:
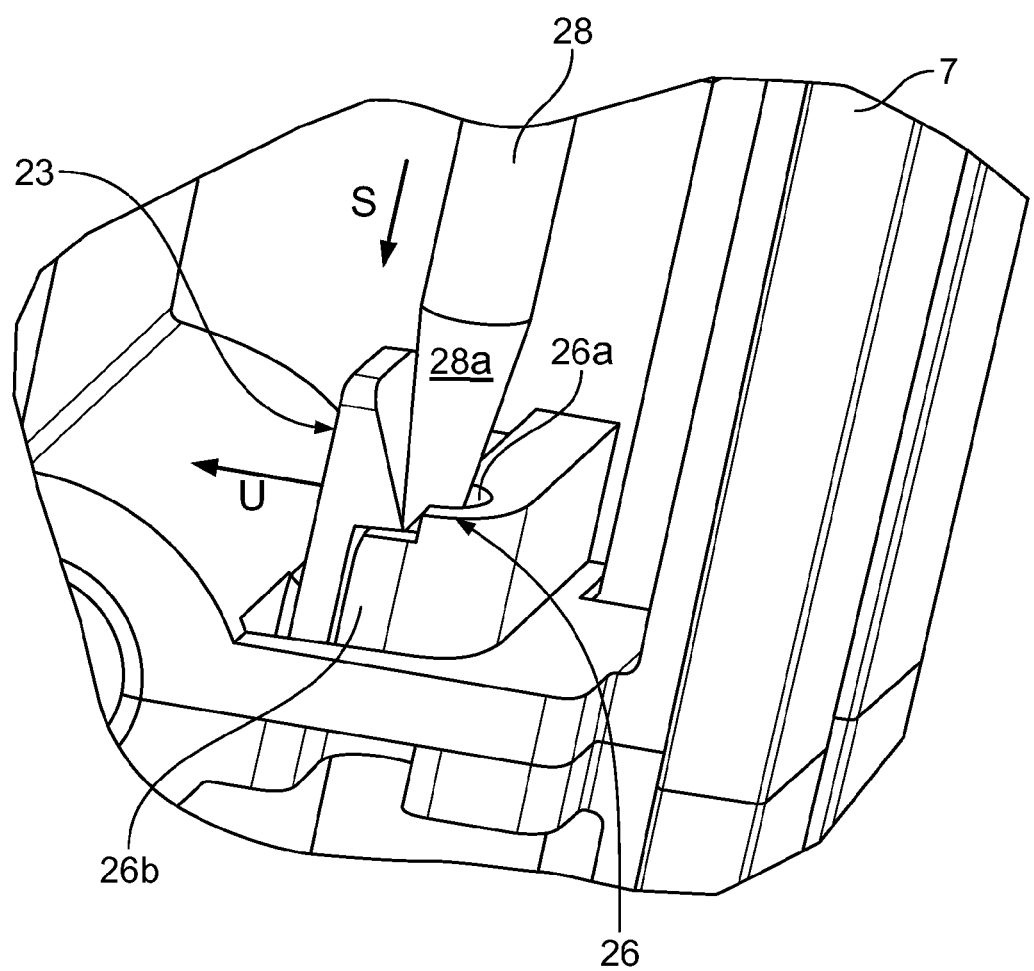
FIG. 10 shows in more detail positive locking members of two mated segment blocks.

As shown in FIG. 10, the locking sections 26b are provided with recesses 26a for receiving the tool 28. The recesses 26a form openings within the locking sections 26. The recess 26a may be funnel shaped or be provided with a face inclined with respect to the stacking direction S. Alternatively or additionally, the dismounting tool 28 may comprise a tapering or conically formed insertion portion 28a, which functions like a wedge when being inserted into the recess 26a. Thus, when inserting the dismounting tool 28 in stacking direction S into the cable support, the positive locking member, which comprises a resiliently deflectable latch member 23a, is moved in an unlocking direction U to release the positive lock of the positive locking members 23 and 26.

The invention claimed is:

1. A cable support for distribution boxes, the cable support comprising:
    a stackable modular assembly that defines a cable passage adapted to receive at least one cable, the stackable modular assembly including at least two segment blocks, each of which form, at a respective end thereof pointing in or against a stacking direction, a part of at least one cable passage, wherein adjacent ones of the segment blocks are configured to releasably latch together, each of the two segment blocks defining access openings that align with each other along an access axis to define a through-passage extending through the two segment blocks in the stacking direction.

2. The cable support according to claim 1, wherein in each of the two segment blocks a half cross-section of the at least one cable passage is formed.

3. The cable support according to claim 1, wherein at least one of the at least two segment blocks comprises an integrally cast push-out element which closes the at least one cable passage.

4. The cable support according to claim 3, wherein each of the at least two segment blocks comprises an integrally cast push-out element, wherein push-out elements of adjacent segment blocks extend in parallel and in opposing directions into the cable passage.

5. The cable support according claim 1, wherein the segment blocks comprise at least one intermediate segment block, which defines at least part of a cable passage on each of opposite ends facing in and against the stacking direction.

6. The cable support according to claim 5, wherein the intermediate segment block is provided with positive locking members on each of the opposite ends.

7. The cable support according to claim 1, wherein at least one end of a first of the segment blocks includes at least one positive locking member, the positive locking member being formed complementary to a positive locking member at an end of a second of the segment blocks.

8. The cable support according to claim 7, wherein the at least one positive locking member at the first segment block includes at least one resiliently deflectable latch member and the at least one positive locking member at the second segment block includes a locking section which is shaped complementary to the latch member.

9. The cable support according to claim 1, wherein each segment block is provided at least at one end with at least one access opening for a dismounting tool, wherein access openings of adjacent segment blocks in a mounted state of the cable support are aligned with each other.

10. The cable support according to claim 9, wherein the access openings of the adjacent segment blocks in the mounted state of the cable support are aligned with at least one access axis extending in the stacking direction.

11. The cable support according to claim 8, wherein the latch members and the locking sections are aligned to each other in the stacking direction.

12. The cable support according to claim 10, wherein a first of the segment blocks includes at least one latch member that is aligned with the access axis.

13. The cable support according to claim 8, wherein each segment block is provided at least at one end with at least one access opening, and wherein the access openings together with the latch members and/or the locking sections in an unlocked state form a tool passage.

14. A distribution box for cable distribution arrangements, comprising:
   a housing defining a recess; and
   a cable support disposed in the recess of the housing, the cable support defining a plurality of cable passages, each cable passage adapted to receive at least one cable, wherein the cable support includes at least two segment blocks, the segment blocks being plugged on each other, each of the at least two segment blocks forming, at a respective end thereof pointing in or against a stacking direction, a part of at least one of the cable passages, the two segment blocks being releasably secured to each other, each of the two segment blocks defining access openings that align with each other along an access axis to define a through-passage extending through the two segment blocks in the stacking direction; and
   a dismounting tool that releases the two segment blocks from each other when inserted into the through-passage.

15. The distribution box according to claim 14, wherein the housing comprises an exterior wall, a part of which is formed by the at least two segment blocks.

16. A cable support for distribution boxes comprising:
   a plurality of segment blocks that are configured to couple together in a stack, wherein adjacent ones of the segment blocks cooperate to define at least one respective cable passage, each of the segment blocks defines at least one opening that aligns with the openings of the other segment blocks to define a passage that extends through the plurality of segment blocks in the stack and that extends orthogonal of the at least one respective cable passage;
   a first positive locking member extending outwardly from one of the segment blocks; and
   a second positive locking member disposed at another of the segment blocks, wherein the first positive locking member secures to the second positive locking member when the segment blocks are coupled together in the stack.

17. The cable support of claim 16, further comprising a dismounting tool that is configured to be inserted into the through-passage, wherein the through-passage is located so that the dismounting tool releases the first positive locking member from the second positive locking member when the dismounting tool is inserted into the through-passage.

18. The cable support of claim 17, wherein the first positive locking member includes a deflectable latch arm and the second positive locking member includes a locking section that is shaped complementary to the deflectable latch arm, and wherein the locking section defines the recess of the respective segment block, whereby inserting the dismounting tool into the through-passage deflects the latch arms away from the locking sections.

19. The cable support of claim 16, wherein the first positive locking member includes a deflectable latch arm and the second positive locking member includes a locking section that is shaped complementary to the deflectable latch arm.

* * * * *